(12) United States Patent
Kang et al.

(10) Patent No.: US 8,495,280 B2
(45) Date of Patent: Jul. 23, 2013

(54) FLASH MEMORY SYSTEM AND DESIGNING METHOD OF FLASH TRANSLATION LAYER THEREOF

(75) Inventors: Jeonguk Kang, Bucheon-si (KR); Yong-Goo Lee, Daejeon (KR); Chanik Park, Hwaseong-si (KR); Jin Soo Kim, Seoul (KR)

(73) Assignees: Samsung Electronics Co., Ltd., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 954 days.

(21) Appl. No.: 12/588,198

(22) Filed: Oct. 7, 2009

(65) Prior Publication Data

US 2010/0100667 A1    Apr. 22, 2010

(30) Foreign Application Priority Data

Oct. 16, 2008    (KR) .................... 10-2008-0101610

(51) Int. Cl.
*G06F 12/00*    (2006.01)
(52) U.S. Cl.
USPC ........................ 711/103; 711/154; 711/170
(58) Field of Classification Search
USPC ........................................ 711/103, 154, 170
See application file for complete search history.

(56) References Cited

U.S. PATENT DOCUMENTS

| | | | |
|---|---|---|---|
| 6,282,605 B1 | 8/2001 | Moore | |
| 2006/0161723 A1 | 7/2006 | Sena et al. | |
| 2006/0282644 A1 | 12/2006 | Wong | |
| 2008/0126684 A1 | 5/2008 | Wu et al. | |

OTHER PUBLICATIONS

L-P. Chang et al., "Efficient management for large-scale flash-memory storage systems with resource conservation.", Trans. Storage, 1(4): 381-418, 2005.
M.-L. Chiang et al., "Using data clustering to improve cleaning performance for flash memory management.", Software Pract. Exper., 29(3): 267-290, 1999.
J.-W. Hsieh et al., "Efficient on-line identification of hot data for flash-memory management.", Proceedings of the 2005 ACM symposium on Applied computing (SAC '05), ACM, 2005, pp. 1-40.
D. Kang et al., "µ-Tree: An Ordered index Structure for NAND Flash Memory.", Proceedings of the $7^{th}$ ACM & IEEE International Conference on Embedded software (EMSOFT '07), ACM, 2007.
J-U. Kang et al., "A Superblock-based Flash Translation Layer for NAND Flash Memory.", Proceedings of the $6^{th}$ ACM & IEEE International Conference on Embedded software (EMSOFT '06), ACM, 2006, pp. 161-170.
J. Kim et al., "A Space-Efficient Flash Translation Layer for CompactFlash Systems.", IEEE Transactions on Consumer Electronics, 48(2): 366-375, May 2002.
S.-W. Lee et al. "A Log Buffer based Flash Transaction Layer using Fully Associative Sector Transaction.", Trans. on Embedded Computing Sys., 6(3): 18, 2007.
M. Rosenblum et al., "The Design and Implementation of a Log-Structured File System.", ACM Trans. Computing Syst., 10(1): 26-52, 1992.
Y.-G. Lee et al., "µ-FTL: A Memory-Efficient Flash Translation Layer Supporting Multiple Mapping Granularities.", (EMSOFT '08), Oct. 2008, pp. 21-30.

*Primary Examiner* — Matthew Bradley
(74) *Attorney, Agent, or Firm* — Harness, Dickey & Pierce, P.L.C.

(57) ABSTRACT

The method of designing a flash translation layer includes receiving a logical address according to an external request and mapping a physical address that corresponds to the logical address. The mapping manages continuous logical addresses and physical addresses corresponding to the logical addresses as one mapping unit.

18 Claims, 12 Drawing Sheets ec=< $\ell$ ,p,n+N>

FLASH MEMORY SYSTEM AND DESIGNING METHOD OF FLASH TRANSLATION LAYER THEREOF

PRIORITY STATEMENT

This U.S. non-provisional patent application claims priority under 35 U.S.C. §119 of Korean Patent Application No. 10-2008-0101610, filed on Oct. 16, 2008, the entire contents of which are hereby incorporated by reference.

BACKGROUND

1. Technical Field

Example embodiments relate to a flash memory system, for example, to a designing method of a flash translation layer thereof.

2. Description of Related Art

Generally, since a flash memory is capable of erasing data of a cell electrically and collectively, it is used for computers and memory cards. Recently, since usage of portable information devices such as mobile phones, personal digital assistants (PDAs), and digital cameras has increased, flash memory are being used as storage devices instead of hard disk drives (HDD). The above-mentioned portable information devices generally require storage devices of high capacity in order to perform various functions (for example, playing movies, playing high quality music, and so forth).

FIG. 1 is a block diagram illustrating a typical memory system. Referring to FIG. 1, a system 100 using a flash memory device 112 as a storage unit includes a memory card 110, a central processing unit (CPU) 120, and a random access memory (RAM) 130. Each of the above components is electrically connected to a system bus 140 for delivering data. The memory card 110 includes a flash controller 111 and the flash memory device 112. The flash controller 111 performs an interfacing operation between a host and the system 100.

The memory card 110 includes a non-volatile flash memory as a storage medium where large-capacity data can be stored. Also, the memory card 110 includes a flash controller 111 for interfacing between the flash memory 112 and a host. A role of the flash controller 111 is related to a flash translation layer (FTL).

The flash memory 112 can provide a fast read speed with a relatively low cost compared to other memory devices. However, an erase operation should be and is performed first before data is written into the flash memory 112. In addition, a data unit to be erased is greater in size than that to be written. This characteristic prevents the flash memory 112 from being used as a main memory. Additionally, if the flash memory 112 is used as an auxiliary memory device, the above-mentioned erasure characteristic is a factor that prevents a file system for a general HDD from being stored as is in the flash memory 112.

Accordingly, in order to conceal an erase operation of the flash memory 112, the FTL is used between a file system and a flash memory. The FTL, maps a logical address that the file system generates into a physical address of the flash memory 112 where an erase operation is performed during a write operation of the flash memory 112. The FTL uses an address mapping table to make address mapping fast. In general, an address mapping table is configured using a high speed SRAM. However, unlike the HDD, the flash memory 112 has a disadvantage that an overwrite operation is not possible on a physical block.

SUMMARY

Example embodiment provides a method of designing a flash translation layer for an effective memory usage.

Example embodiments also provide a new memory system capable of improving performance and reducing costs and power consumption.

According to an example embodiment, a method of designing a flash translation layer includes receiving a logical address according to an external request and mapping a physical address that corresponds to the logical address. The mapping manages continuous logical addresses and physical addresses corresponding to the logical addresses as one mapping unit.

In an example embodiment, the mapping maps using a µ tree.

In an example embodiment, the mapping defines a mapping entry of the mapping unit to include a tree key storing a first logical address among the continuous logical addresses, and a tree record storing a first physical address among the physical addresses and the number of continuous pages.

In an example embodiment, the mapping merges two continuous address mapping entries into one address mapping entry.

In an example embodiment, the method further includes managing bit map information through the µ tree, where the bit map information is used for used for garbage collection.

In an example embodiment, the managing manages a bit map entry of the bit map information to include a tree key storing a physical block number, and a tree record storing valid and invalid information of pages corresponding to the physical block number.

In an example embodiment, the physical block number corresponds to a physical block, and data of a logical address where a write is frequently made and data of a logical address where a write is infrequently made are mixed in the physical block.

In an example embodiment, the managing manages the bit map entry of the bit map information to further include the tree key storing a sub-block number corresponding to at least one of a plurality of sub-blocks. The physical block number is divided into the plurality of sub-blocks and the tree record is allocated separately for each of the sub-blocks.

In an example embodiment, the bit map entry is associated with at least one of the plurality of sub-blocks if the associated sub-block includes at least one invalid page.

In an example embodiment, the mapping updates address mapping information and the managing updates bit map information in the µ tree at each write request.

In an example embodiment, the bit map information about a physical block having at least one valid page is stored in the µ tree.

In an example embodiment, the mapping manages address mapping information and bit map information using the µ tree, the bit map information not being updated in the µ tree each time a write request is made and the bit map information being collected in a bit map cache using a hash table.

In an example embodiment, the mapping further includes storing information about a plurality of continuously invalidated physical pages at an entry of the hash table and erasing all the entries of the hash table in the bit map cache when a size of the bit map cache is greater than a value and then updating the bit map information in the µ tree.

In an example embodiment, the mapping further includes erasing entries of the hash table of the determined block and then updating the bit map information in the µ tree when a block of a garbage collection target is determined.

In an example embodiment, the mapping divides an entire logical address region into a plurality of partitions, and allocates at least one update block into at least one of the divided partitions, where the update block stores new data delivered at a write request, and includes at least one of a valid page, an invalid page, and a free page.

In an example embodiment, the mapping allocates the update block for a corresponding partition of the divided partitions only when the write request is made, and does not allocate the update block for the corresponding partition when no write request is made.

In an example embodiment, the mapping writes the write request to include writing data in the update block of the partition corresponding to the logical address of the write request, at least one of modifying, erasing, and inserting the mapping unit corresponding to the update block, inserting an invalid pair into the bit map cache to update the bit map information, including the bit map update information in the μ tree if the bit map cache is full or is selected as a garbage collection target block, storing a μ tree entry in a memory if a μ tree cache is full, and reading the μ tree entry from the memory if the if the μ tree entry is not found in the μ tree cache.

According to an example embodiment, a memory system includes a non-volatile memory and a memory controller controlling the non-volatile memory. The memory controller has a file translation layer, the file translation layer receiving a logical address according to an external request and mapping a physical address that corresponds to the logical address. The mapping manages continuous logical addresses and physical addresses corresponding to the logical addresses in one mapping unit.

BRIEF DESCRIPTION

The accompanying figures are included to provide a further understanding of example embodiments, and are incorporated in and constitute a part of this specification. The drawings illustrate example embodiments and, together with the description, serve to explain principles of example embodiments. In the figures.

DETAILED DESCRIPTION

Figure 1:
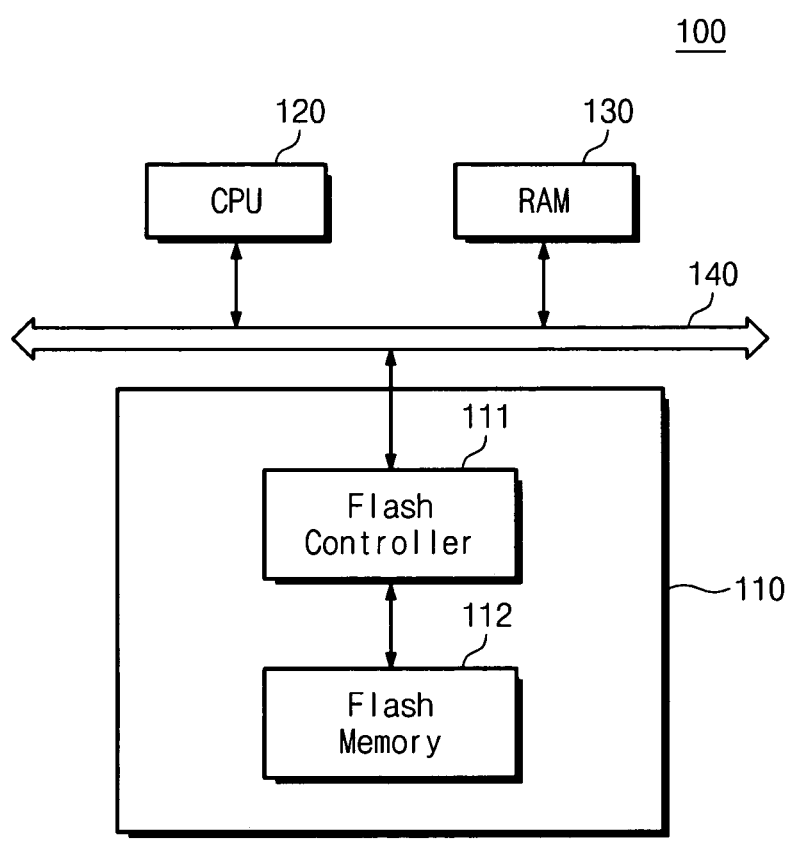
FIG. 1 is a block diagram illustrating a typical memory system.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof. In this specification, the term "and/or" picks out each individual item as well as all combinations of them.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Now, in order to more specifically describe example embodiments, example embodiments will be described in detail with reference to the attached drawings. However, example embodiments are not limited to the embodiments described herein, but may be embodied in various forms.

When it is determined that a detailed description related to a related known function or configuration may make the purpose of example embodiments unnecessarily ambiguous, the detailed description thereof will be omitted. Also, terms used herein are defined to appropriately describe example embodiments and thus may be changed depending on a user, the intent of an operator, or a custom. Accordingly, the terms must be defined based on the following overall description within this specification.

Hereinafter, example embodiments will be described in detail with reference to the accompanying drawings, in order for those skilled in the art to realize the technical ideas of example embodiments without difficulties.

A flash translation layer of example embodiments manages continuous logical addresses and corresponding physical addresses by a mapping unit. For example, the flash translation layer of example embodiments is realized to manage mapping information using a µ tree. Therefore, the flash translation layer of example embodiments can reduce an amount of mapping information by using diverse mapping units. As a result, memory usage can be reduced in a memory system using the flash translation layer of example embodiments and according thereto, expenses can be saved.

Information that the flash translation layer must manage includes address mapping information and garbage collection information typically. The address mapping information is used to map logical addresses in an aspect of a host into physical addresses of a flash memory, and the garbage collection information is used to retrieve invalid pages and change them into free pages. Below, an address mapping method according to example embodiments using a µ tree and a garbage collection method will be described.

First, the address mapping method will be described. In a typical flash translation layer, a logical address is generally mapped into a physical address using a table. Because of this, a mapping unit is fixed by a block unit or a page unit. However, it is inefficient for an entire logical address region to be managed by one type of mapping unit. The reason is that there may be a logical address region that requires different types mapping units, such as a small mapping unit or a large mapping unit. For example, even if a logical address region (such as is written at the write request for a large size such as downloading of a movie or installing of an application program) uses a large mapping unit, while performance deterioration may not occur, an amount of mapping information could still be reduced. On the contrary, when a write request has a small size (such as file system meta data or internet temporary files), a small mapping unit may need to be used to prevent performance deterioration. Accordingly, an address mapping method of the flash translation layer according to example embodiments manages with various mapping units using a µ tree.

Figure 2:
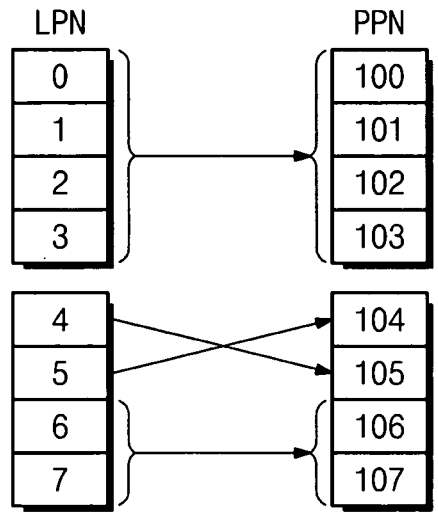
FIG. 2 is a view illustrating a multi mapping among address mappings.

FIG. 2 is a view illustrating a multi mapping among address mappings. Referring to FIG. 2, logical page numbers (LPNs) 0 to 3 are continuously mapped into physical page numbers (PPNs) 100 to 103. LPNs 4 and 5 are mapped into PPNs 105 and 104, respectively. LPNs 6 and 7 are continuously mapped in to PPNs 106 to 107.

Figure 3:
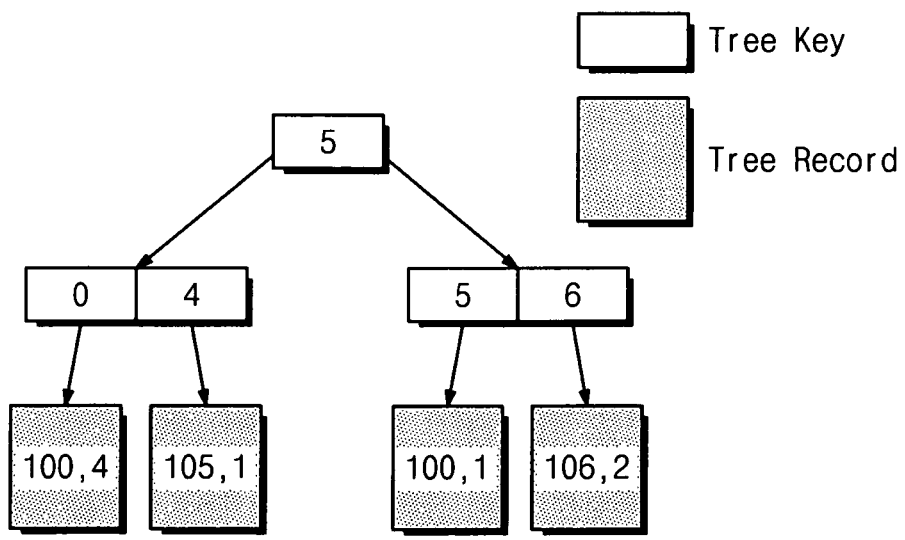
FIG. 3 is a view illustrating the multi mapping of FIG. 2 realized using a μ tree.

FIG. 3 is a view illustrating the multi mapping of FIG. 2 realized using a µ tree. Referring to FIG. 3, a tree key in the µ tree is the first logical page number among the continuously mapped logical page numbers. A tree record paired with each tree key is the first physical page number among the continuously mapped physical page numbers and the number of continuously mapped pages.

For example, a tree record (100, 4) connected to a tree key (0) represents that LPNs 0 to 3 are continuously mapped into PPNs 100 to 103. For example, a tree entry, which includes a pair of a tree key and a tree record, becomes one mapping unit that represents continuously mapped logical and physical pages. According to example embodiments, a mapping entry of these various sizes is called an extent.

Figure 4:
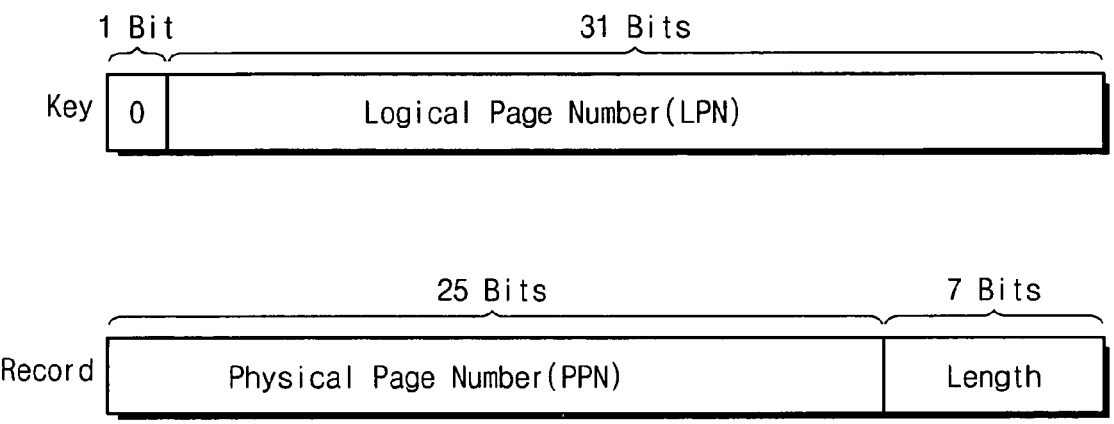
FIG. 4 is a view illustrating an extent according to example embodiments.

FIG. 4 is a view illustrating an extent according to example embodiments. Referring to FIG. 4, the extent includes one tree key and one tree record. Each of the tree key and the tree record is set with 32 bits. Although 32 bits are used for each of the tree key and the tree record, example embodiments are not limited thereto. The sizes of the tree key and the tree record may vary according to the size of a NAND flash memory.

The most left one bit of the tree key stores information to distinguish bit map information used for garbage collection. In example embodiments, this bit stores '0' all the time. The remaining 31 bits of the tree key include the first logical page number among continuously mapped logical page numbers.

The left 25 bits of the tree record stores the first physical page number among the continuously mapped physical page numbers, and the remaining 7 bits store the number of the continuously mapped logical and physical pages. For example, the number of continuous pages may be represented with 7 bits.

The reason of representing the number of continuous pages with 7 bits is that one block includes 128 pages in the recent NAND flash memories and at least 7 bits are required to represent the 128 pages. Accordingly, this setting may vary according to characteristics of the NAND flash memory.

As mentioned above, the extent, which is mapping information of example embodiments, is expressed with an ordered pair of <L, P, N>. Here, L represents the first logical page number, P represents the first physical page number, and N represents the number of continuous pages. Accordingly, the extent <L, P, N> means that logical page numbers L to (L+N−1) are continuously mapped into the physical page numbers P to (P+N−1).

The typical flash translation layer performs mapping by a block unit or a page unit. The flash translation layer of a block mapping method has lower performance but less memory usage. While the flash translation layer of a page mapping method has higher performance but more memory usage.

However, the flash translation layer of example embodiments uses the continuously mapped logical and physical pages as one mapping unit. For example, the flash translation layer can perform mapping by a mapping unit of various sizes. Therefore, the flash translation layer of example embodiments uses a less amount of memory but performance is not decreased or deteriorated.

The above-mentioned flash translation layer of example embodiments manages mapping information using a μ tree. However, the flash translation layer of example embodiments does not necessarily manage mapping information by only using a μ tree. The flash translation layer of example embodiments may mange mapping information also using other algorithms that utilizes continuously mapped logical and physical pages as one mapping unit.

Next, a garbage collection method will be described. If the number of free pages is insufficient in a NAND flash memory, the flash translation layer collects invalid pages and then creates new free pages through a garbage correction process. One of the simplest garbage collection methods selects a block having the largest number of invalid pages as a collection target, and copies valid pages of the block into another place and erases the block. For this method, whether data written in each physical page is valid or invalid should be determined, which is referred to as garbage collection information. One bit is sufficient for distinguishing validity or invalidity about each physical page, and this is called bit map information.

If this bit map information is stored in a memory (not a NAND flash memory), memory usage becomes increased. Accordingly, example embodiments manage the bit map information using a μ tree like the address mapping information. The flash translation layer of example embodiments is usually stored in a flash memory, and frequently-used bit map information is partially stored in a μ tree cache of a memory.

Figure 5:
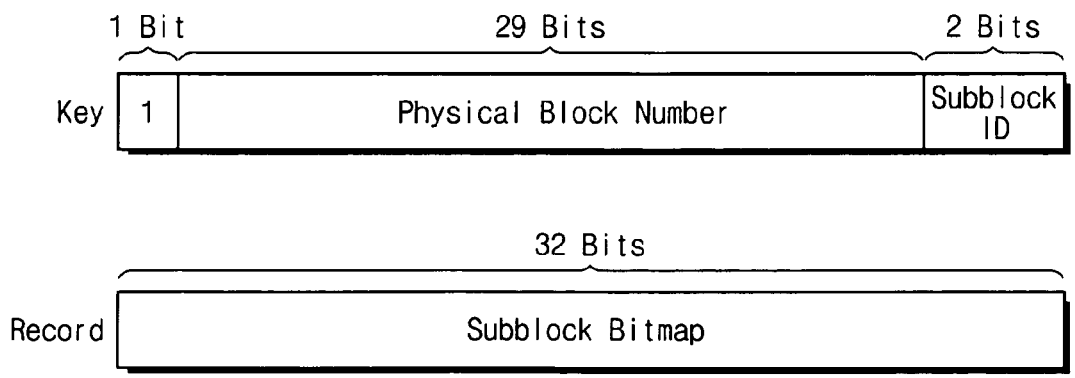
FIG. 5 is a view illustrating a μ tree key and record structure for storing bit map information.

FIG. 5 is a view illustrating a μ tree key and record structure for storing bit map information. Referring to FIG. 5, the tree key and tree record are set with each 32 bits. The tree key includes 1 bit for storing '1' to represent garbage collection information, 29 bits storing a physical block number, and 2 bits for storing a sub block number. Example embodiments are realized suitable for a NAND flash memory having 128 pages in one block. A Total of 4μ tree entries are required to store bit map information of one block. Accordingly, one block is divided into four sub blocks, and one μ tree entry is allocated to each sub block to store bit map information. This sub block number may vary when the block size of the NAND flash memory is different.

Referring to FIG. 5 again, the most left 1 bit of the tree key is stored with 1 all the time. This is to distinguish bit map information from an extent. Additionally, the middle 29 bits of the tree key store a physical block number having bit map information. The most right 2 bits of the tree key store a sub block number in a physical block. The 32 bits of the tree record store valid or invalid information of the 32 pages included in each sub block.

In general, most of the physical blocks have only a valid page. However, only a few of the physical blocks have an invalid page. Accordingly, example embodiments may prevent the bit map entry from being updated by the μ tree, such that the number of bit map entries of a μ tree is reduced when all pages in a sub block are valid. For example, only when the sub block has at least one invalid page, is the bit map entry is updated by the μ tree. If the μ tree is searched in order to obtain bit map information about a sub block, all pages of the corresponding sub block are valid when there is no bit map entry of a corresponding sub block.

The flash translation layer of example embodiments updates address mapping information and bit map information in the μ tree at each write request. This update operation is completed in a μ tree cache initially. However, the size of the μ tree cache is configured to be small generally in order to reduce memory usage. Due to this, an overhead of the μ tree cache may be somewhat large. Here, the overhead of the μ tree cache means that μ tree entries having a write cache are stored in a flash memory when a μ tree write cache is full or a desired μ tree entry is read from the flash memory when it is not founded in a μ tree read cache.

In order to resolve the above performance deterioration, example embodiments additionally introduce a hash table structure which is called a bit map cache. The bit map cache does not directly update bit map update information (which is generated each time a write request is processed) in the μ tree, and gathers them in advance. Therefore, the load of the μ tree cache is reduced.

Figure 6:
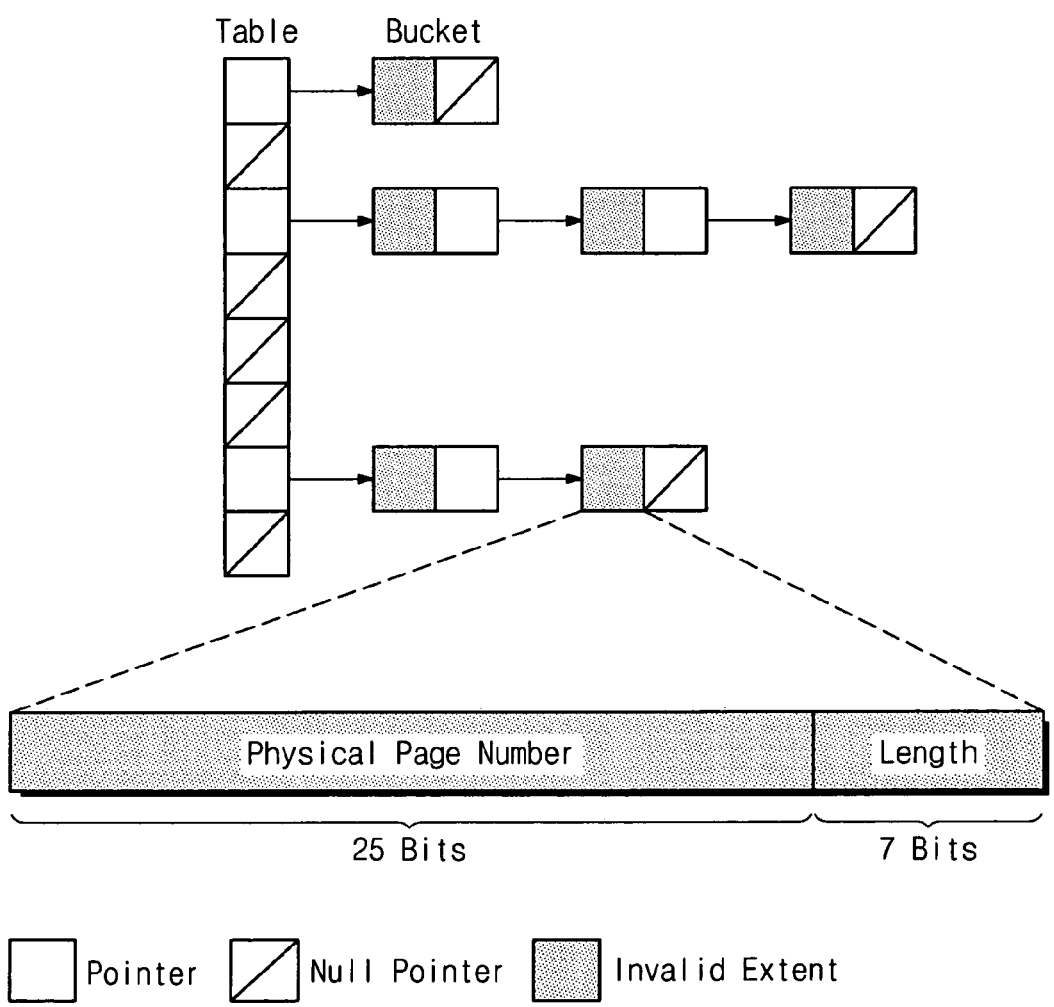
FIG. 6 is a view illustrating a bit map cache according to example embodiments.

FIG. 6 is a view illustrating a bit map cache according to example embodiments. Referring to FIG. 6, the bit map cache includes a hash table and buckets. Each hash table entry stores information about a plurality of physical pages that will be continuously invalid. This is called an invalid extent. The left 25 bits of the invalid extent stores the first physical page number among the continuously invalid physical page numbers. The remaining 7 bits stores the number of the continuously invalid physical pages. The invalid extent of example embodiments stores the number of the physically continuous invalid pages.

Here, the remainder obtained by dividing the physical page number of the invalid extent by the size of the hash table is used as a hash key. If the size of the bit map cache reaches the predetermined memory limit, all invalid extents in the bit map cache are erased and the bit map update information stored therein is updated in a μ tree at the same time.

If a collection target block of garbage collection is determined, only the invalid extents in a hash bucket chain corresponding to a block number are erased, and bit map update information stored therein is updated in the μ tree.

A physical block in the NAND flash memory of example embodiments is largely classified into a data block, a free block, and an update block. The data block does not have a free page at all and all its pages are written once. This data block includes valid pages and invalid pages. The free block includes only free pages. The update block stores new data delivered at a write request, and includes a valid page, an invalid page, and a free page.

The flash translation layer of a typical page mapping method generally includes only one update block in an entire system. However, in this case, data of a logical address region where a write request is frequently made and data of a logical address region where there is almost no write request are mixed in one physical block. Therefore, performance deterioration occurs in an entire system.

On the contrary, example embodiments divide an entire logical address region into a plurality of partitions in order to resolve the above limitation, and provide an original update block in each partition. The update block processes a write request of a corresponding partition. The update block in each partition is actually allocated as a corresponding partition only when a write request is made, and is not allocated for a partition where no write request is made. Therefore, a waste of the free block can be reduced.

Below, a read request processing operation of a flash translation layer according to example embodiments will be described.

Figure 7:
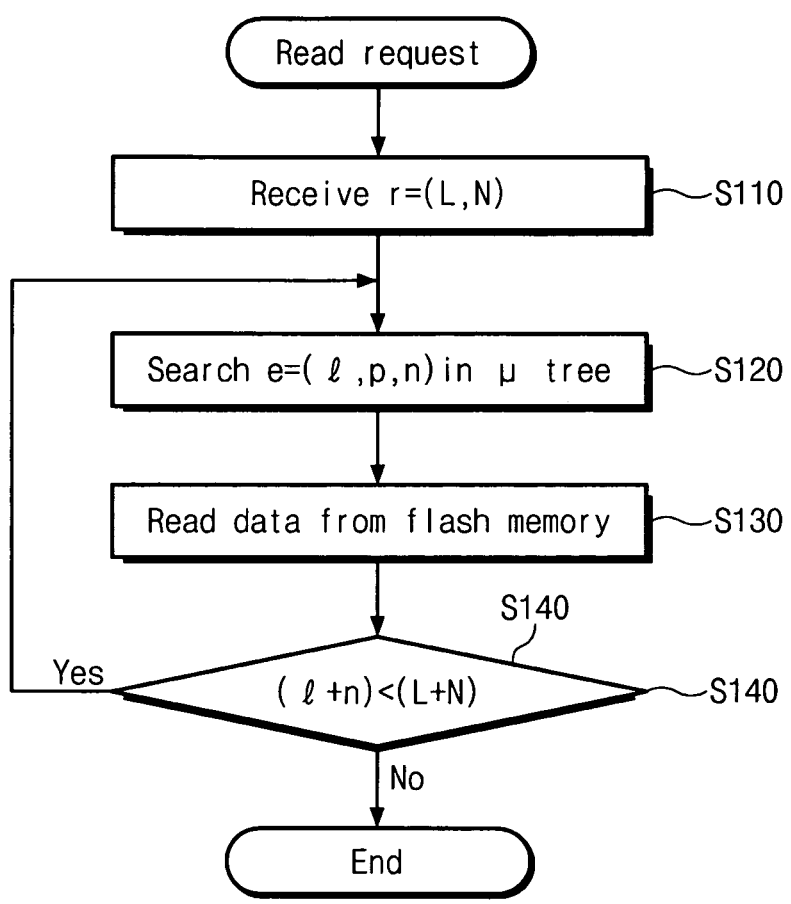
FIG. 7 is a flowchart illustrating a read request processing operation according to a flash translation layer of example embodiments.

FIG. 7 is a flowchart illustrating a read request processing operation according to a flash translation layer of example embodiments. Referring to FIG. 7, the read request processing operation is as follows. A read request is delivered from a host to a flash translation layer. At this point, the delivered read request is r=<L, N>. Here, the L is a logical page number that will be read first, and N is the number of logical pages to be read in operation S110. When the read request is made, example embodiments search an extent e=<l, p, n> in a μ tree in order to find a position of a physical page corresponding to a logical page in operation S120. Here, the extent e must satisfy the below conditions.

$$(l=L) \lor (l<L \land L<(l+n))$$

Through the extent e satisfying the above condition, data corresponding to a read request are read from a flash memory in operation S130. If the range of the found extent may not cover all the range of the read request, it is determined that (l+n)<(L+N) in operation S140. If (l+n)<(L+N) is not satisfied, then a read request is completed and the flow ends. If not (e.g. (l+n)≧(L+N)), then the flow returns to operation S120 in order to find the next extent and read the remaining portion.

A write request processing operation of a flash translation layer according to example embodiments will be described below.

The write request delivered to a flash translation layer has three parameters such as w=<L, N, D>. L is a logical page number. N is the number of pages. D is data to be written. The write request is processed with more steps than a read request because a change of entries in a μ tree is required at a write request.

Figure 8:
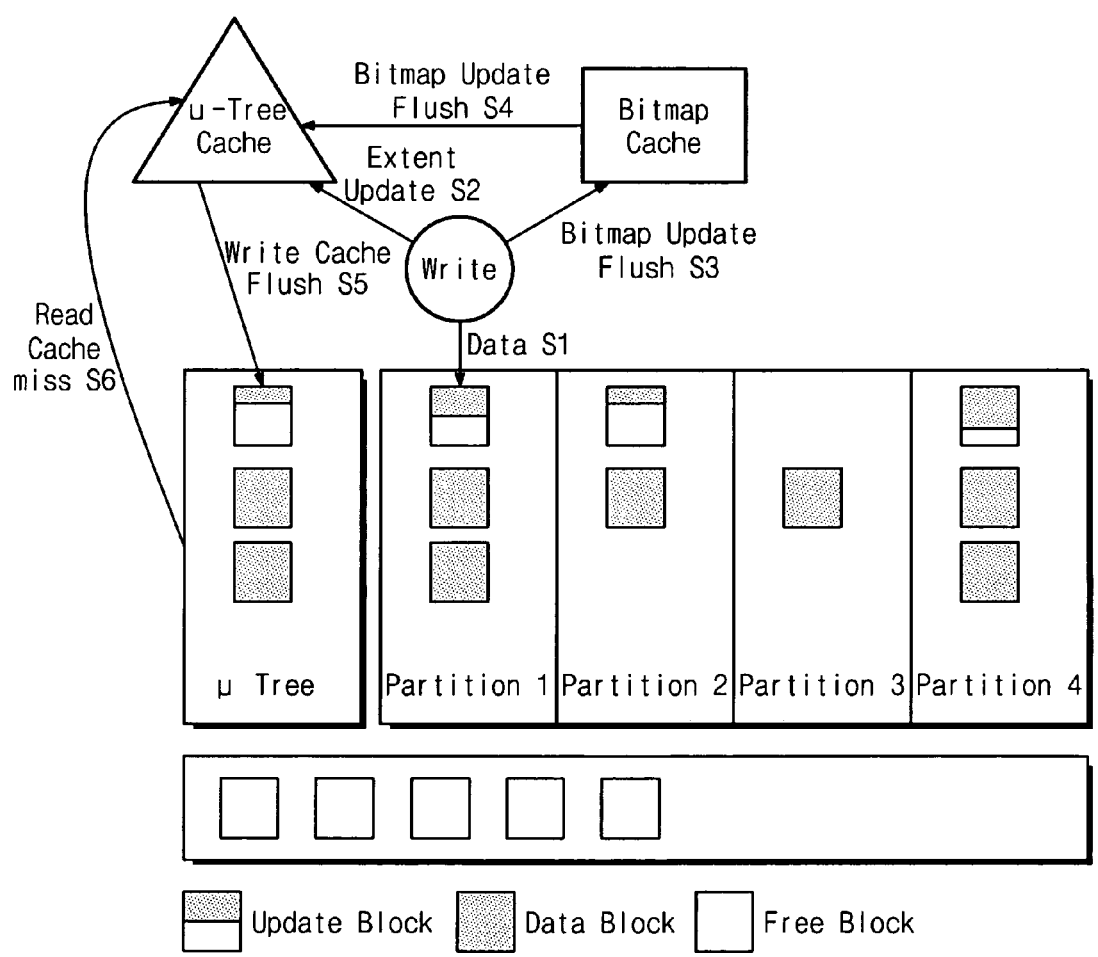
FIG. 8 is a view illustrating a structure of an entire flash translation layer at a write request according to example embodiments.

FIG. 8 is a view illustrating a structure of an entire flash translation layer at a write request according to example embodiments. Referring to FIG. 8, the write request of example embodiments is processed as follows. Data are written in an update block of a partition corresponding to a logical address at a write request in operation S1. Next, an extent is modified, erased, and inserted to update the latest address mapping information in operation S2. Next, an invalid extent is inserted into a bit map cache to update bit map information in operation S3. If bit map update information is full in the bit map cache or is selected as a garbage collection target block, the bit map update information in the bit map cache is reflected on the μ tree in operation S4. If the μ tree write cache is full, μ tree entries are stored in the NAND flash memory in operation S5. If a desired μ tree entry is not found in the μ tree read cache, it will be read from the NAND flash memory in operation S6.

In more detail, a write request operation on the flash translation layer of example embodiments will proceed according to the following four operations.

(1) Data Writing

Once the write request w=<L, N, D> is delivered, according to example embodiments, requested data D are written first in an update block allocated to a partition having a logical address L. For example, as illustrated in FIG. 8, the data D are written in an update block of a first partition.

If the requested data cannot be written because the number of remaining free pages in an update block is insufficient, a new free block is allocated into an update block of a corresponding partition, and then the remaining data are continuously written. This process is performed repeatedly until the requested data D are completely written, and thus if necessary, a greater number of free blocks will be consumed. During this process, if a free block is insufficient, garbage collection is performed as mentioned above.

(2) Invalidation of Extent

Once new data are written, physical pages having previous data are invalidated. Accordingly, an extent for mapping them is also invalidated. The invalidated extent is erased or modified in a μ tree. In more detail, according to a relationship between a new write request w=<L, N, D> and a currently existing extent e=<l, p, n>, an invalidation process may have the following four cases.

Figure 9:
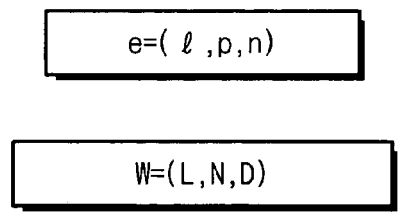
FIG. 9 is a view illustrating a case where a range of an extent is included in a range of a write request w.
Figure 10:
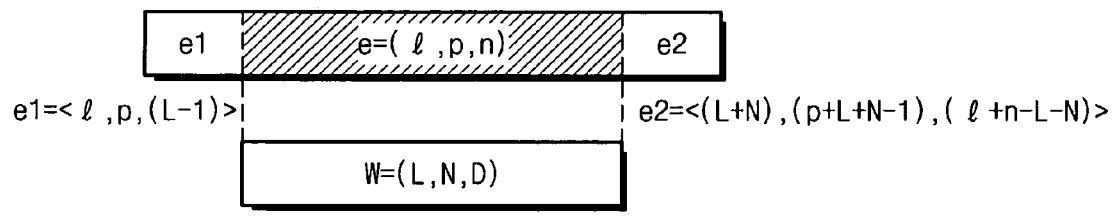
FIG. 10 is a view illustrating a write request is included in a range of an extent.
Figure 11:
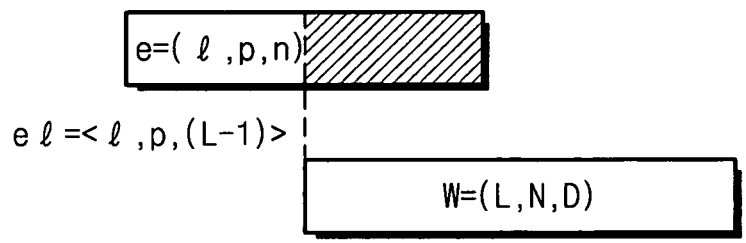
FIG. 11 is a view illustrating a case where the right portion of an extent overlaps a range of a write request w.
Figure 12:
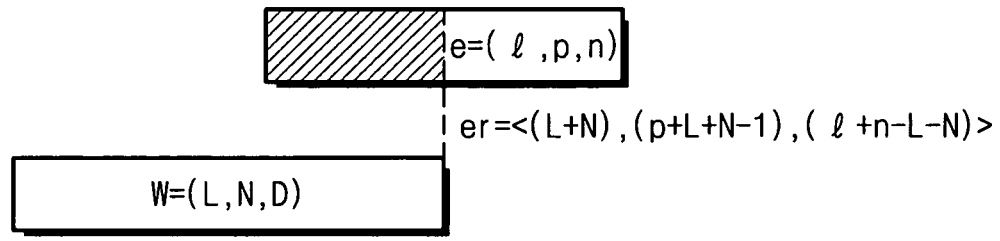
FIG. 12 is a view illustrating a case where the left portion of an extent overlaps a range of a write request w.

FIG. 9 is a view illustrating a case where a range of an extent is included in a range of a write request w. FIG. 10 is a view illustrating a write request is included in a range of an extent. FIG. 11 is a view illustrating a case where the right portion of an extent overlaps a range of a write request w. FIG. 12 is a view illustrating a case where the left portion of an extent overlaps a range of a write request w.

First, as shown in FIG. 9, a range of the extent e is not included in a range of a write request w. This case satisfies the following equation.

$$((L \leq l) \land (L+N)<(l+n))$$

At this point, the invalidation process completely deletes the extent e from the μ tree.

Second, as shown in FIG. 10, a write request is included within a range of the extent e. This case satisfies the following equation.

$$((l<L) \land (L+N)<(l+n))$$

At this point, the invalidation process invalidates the middle portion of the extent e. Accordingly, the extent e is divided into two extents such as e1=<l, p, L−1> and e2=<(L+N), (p+L+N−1), (l+n−L−N)>.

Third, as shown in FIG. 11, the right portion of the extent overlaps a range of a write request w. This case satisfies the following equation.

$$((l<L) \land (l+n)<(L+N))$$

At this point, an invalidation process invalidates only the right portion of the extent e. Accordingly, the extent e is changed into a new extent e1=<l, p, (L−1)>.

Fourth, as shown in FIG. 12, the left portion of the extent overlaps a range of a write request w. This case satisfies the following equation.

$$((L<l) \land (L+N)<(l+n))$$

At this point, the invalidation process invalidates only the left portion of the extent e. Accordingly, the extent e is changed into a new extent er=<(L+N), (p+L+N−1), (l+n−L−N)>.

Figure 13:
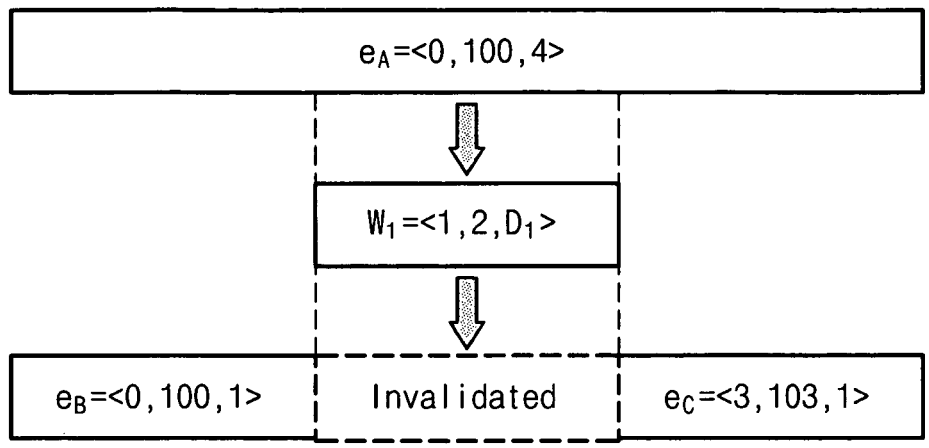
FIGS. 13 and 14 are views illustrating an extent invalidating operation according to example embodiments.
Figure 14:
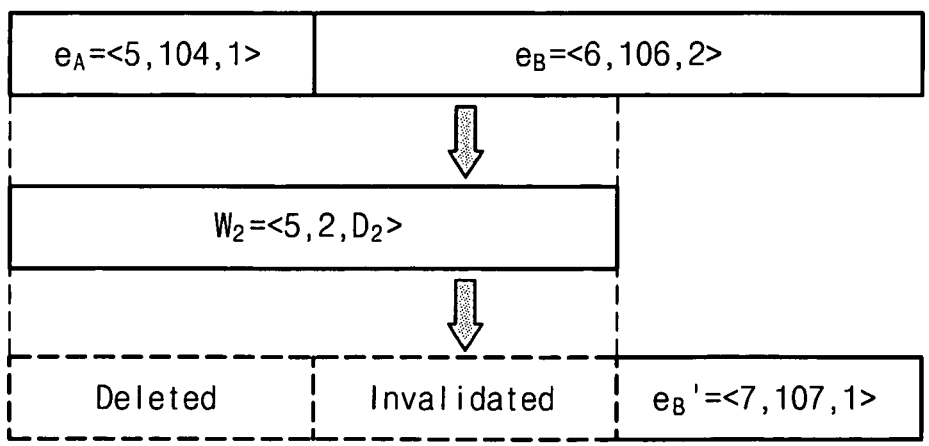

FIGS. 13 and 14 are views illustrating an extent invalidation process according to example embodiments.

Referring to FIG. 13, an extent $e_A$=<0, 100, 4> is divided into two extents $e_B$=<0, 100, 1> and $e_C$=<3, 103, 1> by a write request $w_1$=<1, 2, $D_1$>.

Referring to FIG. 14, an extent $e_A=\langle 5, 104, 1\rangle$ and an extent $\langle 6, 106, 2\rangle$ is changed new extent $e_B'=\langle 7, 107, 1\rangle$ by a write request $W_2=\langle 4, 3, D_2\rangle$. Wherein the extent $e_A=\langle 5, 104, 1\rangle$ is deleted and the left portion of the extent $e_B=\langle 6, 106, 2\rangle$ is invalidated.

(3) New Extent Update

Once new data are written, a new extent is required to map the new data. Accordingly, after an existing extend is invalidated, a new extent having the latest mapping information is updated. At this point, the number of extents is identical to the number of update blocks used for processing a write request.

Figure 15:
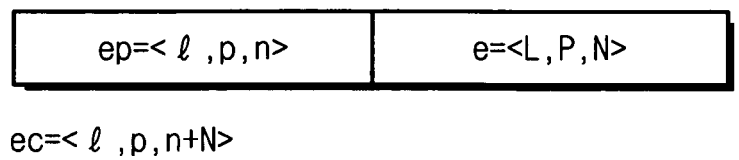
FIG. 15 is a view illustrating an extent merging operation according to example embodiments.

FIG. 15 is a view illustrating an extent merging operation according to example embodiments. If an extent that will be newly updated and an extent in an existing μ tree are logically and physically continuous, instead of updating a new extent, an existing extent is extended. This is called an extent merge. In more detail, if relationship $((l+n)=L\wedge(p+n)=P)$ exists between an extent $e=\langle L, P, N\rangle$ that will be updated in a μ tree and an extent $ep=\langle l, p, n\rangle$ in an existing μ tree, instead of updating the new extent e, the length of the existing extent ep is changed from n to (n+N). As a result, as illustrated in FIG. 15, it becomes the merged extent $ec=\langle l, p, n+N\rangle$. Therefore, example embodiments may reduce the number of extents in the μ tree.

(4) Bit Map Information Update

Once change, deletion, update operations of an extent are completed, an update operation of bit map information is performed. For this, an invalid extent is updated in a bit map cache. One invalid extent is generated in each extent that is changed and erased. Additionally, if two extents are physically continuous, two extents are merged in a case of an invalid extent.

Figure 16:
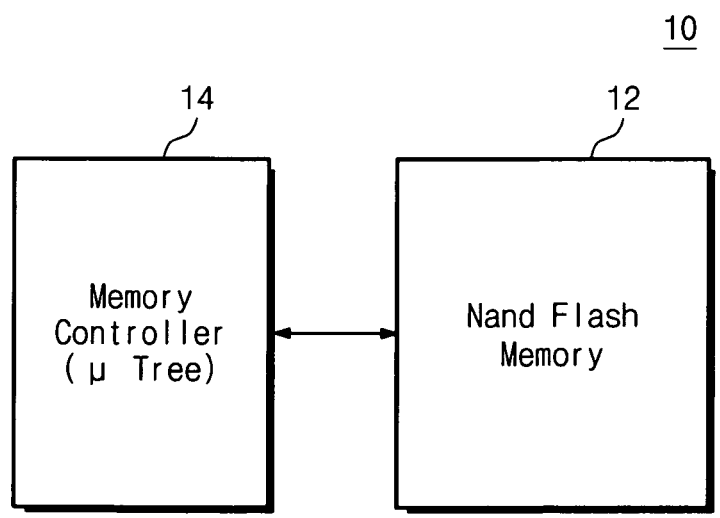
FIG. 16 is a view illustrating a memory system according to example embodiments.

FIG. 16 is a view illustrating a memory system 10 according to example embodiments. Referring to FIG. 16, the memory system 10 includes a NAND flash memory 12 and a memory controller 14 controlling the NAND flash memory 12. The memory controller 14 maps address information using a μ tree or performs a garbage collection operation. This memory system 10 may be used as various storage devices for storing data in the NAND flash memory 12.

Figure 17:
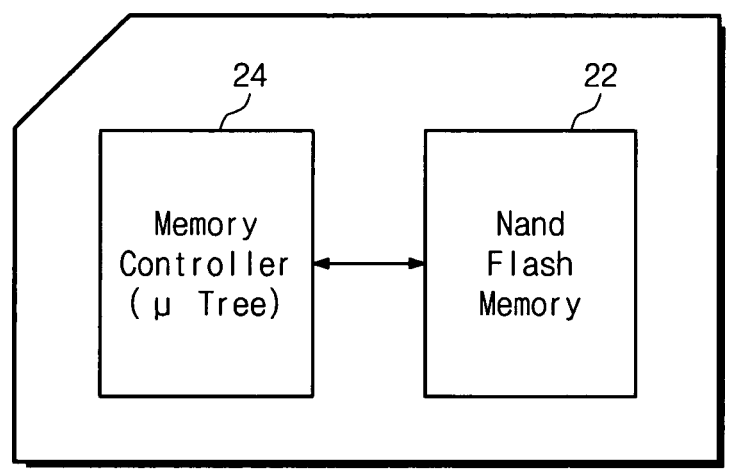
FIG. 17 is a view illustrating a memory card according to example embodiments.

FIG. 17 is a view illustrating a memory card 20 according to example embodiments. Referring to FIG. 17, the memory card 20 includes a NAND flash memory 22 and a memory controller 24 controlling the NAND flash memory 22. The memory controller 22 maps address information using a μ tree or performs a garbage collection operation. This memory card 20 may be applicable to a multimedia card (MMC) or a secure digital (SD) card.

Figure 18:
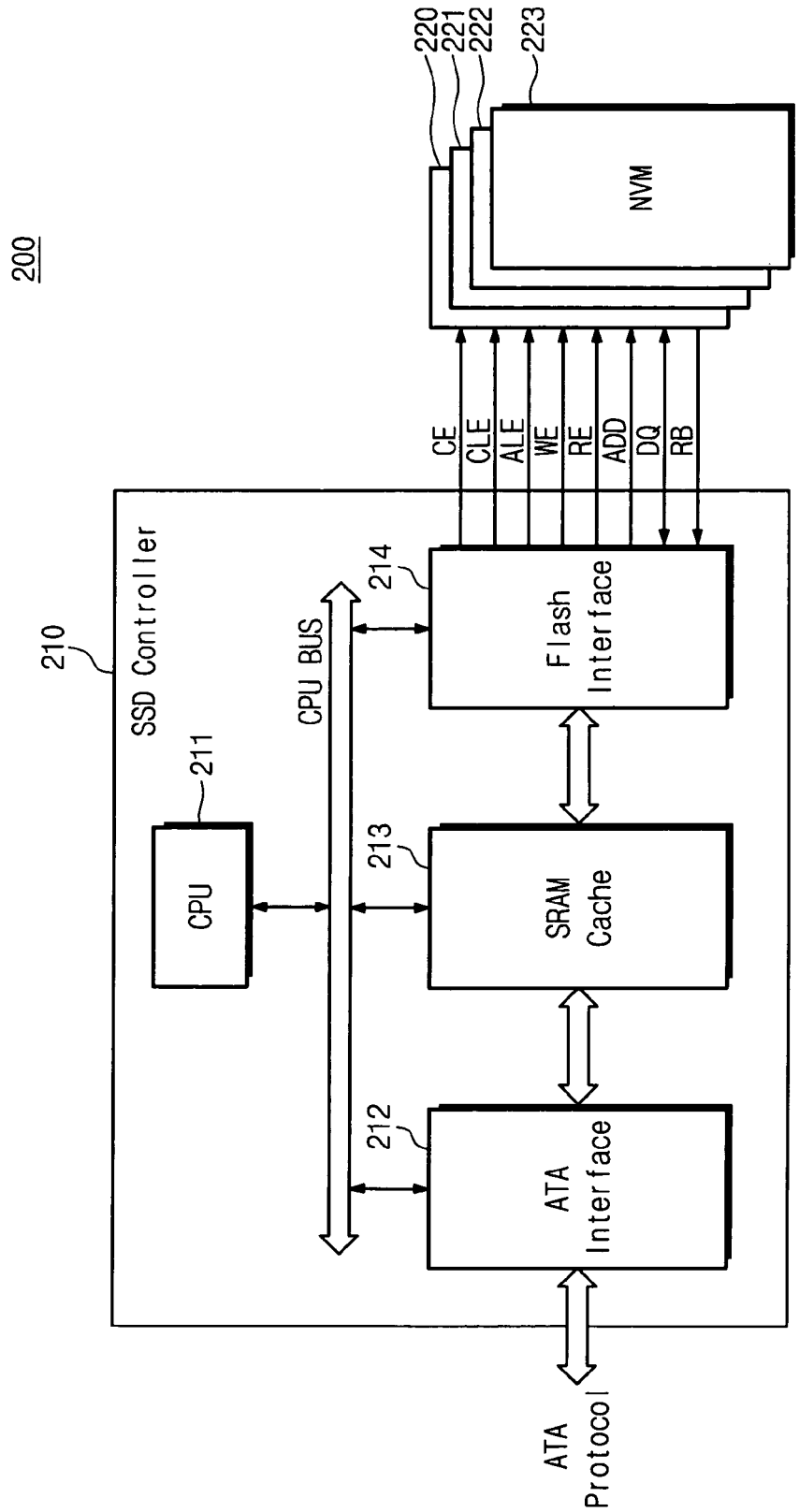
FIG. 18 is a view illustrating a SSD system according to example embodiments.

FIG. 18 is a view illustrating a SSD system 200. Referring to FIG. 18, the SSD system 200 includes a SSD controller 210 and flash memories 220 to 223. The SSD controller 210 maps address information using a μ tree or performs a garbage collection operation.

The memory system of example embodiments may be applicable to the SSD. SSD products, which are expected to replace hard disk drive (HDD) products, receive great attentions recently in the next generation memory market. The SSD is a data storage device using memory chips such as a flash memory to store data instead of a rotating disk used in a typical HDD. The SSD operates at a higher speed, is stronger to the external impact, and consumes less power compared to the mechanically rotating HDD.

Referring to FIG. 18 again, a central processing unit (CPU) 211 receives an instruction from a host and then, determines and controls whether data from the host are stored in a flash memory or data read from a flash memory are transmitted into the host. An ATA interface 212 exchanges data with the host according to a control of the CPU 211. The ATA interface 212 fetches an instruction and an address from the host and delivers them into the CPU 211 through a CPU bus. The data inputted to the host through the ATA interface 212 or the data to be transmitted to the host are delivered through a SRAM cache 213 without passing through the CPU bus according to a control of the CPU 211.

The SRAM 213 temporarily stores transferring data between the host and the flash memories 220 and 223. Additionally, the SRAM cache 213 is used to store programs that will be operated by the CPU 211. The SRAM cache 2123 may be regarded as one kind of a buffer memory, and does not necessarily include SRAM. A flash interface 214 exchanges data with non-volatile memories used as a storage device. The flash interface 214 may be configured to support a NAND flash memory, One-NAND flash memory, or a multi-level flash memory.

The memory system according to example embodiments may be used as a mobile storage device. Accordingly, example embodiments may be used as a storage device of an MP3 player, a digital camera, a personal digital assistant (PDA), or an e-Book. Additionally, example embodiments may be used as a storage device of a digital TV or a computer.

A memory system or a storage device according to example embodiments may be mounted through various kinds of packages. For example, the flash memory and/or the memory controller may be mounted through various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

As mentioned above, the flash translation layer of example embodiments manages addresses by various mapping units, such that memory usage related to mapping can be reduced.

The above-disclosed subject matter is to be considered illustrative, and not restrictive, and the appended claims are intended to cover all such modifications, enhancements, and other embodiments, which fall within the true spirit and scope of example embodiments. Thus, to the maximum extent allowed by law, the scope of example embodiments is to be determined by the broadest permissible interpretation of the following claims and their equivalents, and shall not be restricted or limited by the foregoing detailed description.

What is claimed is:

1. A method of designing a flash translation layer, the method comprising:
receiving a logical address according to an external request; and
mapping a physical address that corresponds to the logical address, wherein the mapping manages continuous logical addresses and physical addresses corresponding to the logical addresses as one mapping unit, the mapping includes managing bit map information through the a μ tree, and each of a plurality of bit map entries of the bit map information include a first tree key storing a physical block number and a first tree record storing information indicating whether pages corresponding to the physical block number are valid or invalid.

2. The method of claim 1, wherein the mapping defines a mapping entry of the mapping unit to include,
   a second tree key storing a first logical address among the continuous logical addresses, and
   a second tree record storing a first physical address among the physical addresses and the number of continuous pages.

3. The method of claim 2, wherein the mapping merges two continuous address mapping entries into one address mapping entry.

4. The method of claim 1,
   wherein the bit map information is used for used for garbage collection.

5. The method of claim 1, wherein,
   the physical block number corresponds to a physical block, and
   data of a logical address where a write is frequently made and data of a logical address where a write is infrequently made are mixed in the physical block.

6. The method of claim 1, wherein the managing manages the bit map entry of the bit map information to further include,
   the tree key storing a sub-block number corresponding to at least one of a plurality of sub-blocks, wherein
   the physical block number is divided into the plurality of sub-blocks, and the tree record is allocated separately for each of the sub-blocks.

7. The method of claim 6, wherein the bit map entry is associated with at least one of the plurality of sub-blocks if the associated sub-block includes at least one invalid page.

8. The method of claim 4, wherein the mapping updates address mapping information and the managing updates bit map information in the μ tree at each write request.

9. The method of claim 4, wherein the bit map information about a physical block having at least one valid page is stored in the μ tree.

10. The method of claim 1, wherein the mapping manages address mapping information and bit map information using the μ tree, the bit map information not being updated in the μ tree each time a write request is made and the bit map information being collected in a bit map cache using a hash table.

11. The method of claim 10, wherein the mapping further comprises:
   storing information about a plurality of continuously invalidated physical pages at an entry of the hash table; and
   erasing all the entries of the hash table in the bit map cache when a size of the bit map cache is greater than a value and then updating the bit map information in the μ tree.

12. The method of claim 11, wherein the mapping further comprises:
   erasing entries of the hash table of the determined block and then updating the bit map information in the μ tree when a block of a garbage collection target is determined.

13. The method of claim 1, wherein the mapping divides an entire logical address region into a plurality of partitions, and allocates at least one update block into at least one of the divided partitions, where the update block stores new data delivered at a write request, and includes at least one of a valid page, an invalid page, and a free page.

14. The method of claim 13, wherein the mapping allocates the update block for a corresponding partition of the divided partitions only when the write request is made, and does not allocate the update block for the corresponding partition when no write request is made.

15. The method of claim 14, wherein the mapping writes the write request to include:
   writing data in the update block of the partition corresponding to the logical address of the write request;
   at least one of modifying, erasing, and inserting the mapping unit corresponding to the update block;
   inserting an invalid pair into the bit map cache to update the bit map information;
   including the bit map update information in the μ tree if the bit map cache is full or is selected as a garbage collection target block;
   storing a μ tree entry in a memory if a μ tree cache is full; and
   reading the μ tree entry from the memory if the μ tree entry is not found in the μ tree cache.

16. A memory system comprising:
   a non-volatile memory; and
   a memory controller configured to control the non-volatile memory, wherein
   the memory controller has a file translation layer, the file translation layer being configured to receive a logical address according to an external request and map a physical address that corresponds to the logical address, and
   the memory controller is configured such that
      the mapping manages continuous logical addresses and physical addresses corresponding to the logical addresses in one mapping unit,
      the mapping includes managing bit map information through the a μ tree, and
      each of a plurality of bit map entries of the bit map information include a first tree key storing a physical block number and a first tree record storing information indicating whether pages corresponding to the physical block number are valid or invalid.

17. The method of claim 1, wherein the first tree key includes a bit value to indicate whether the mapping is address mapping information or bit map information.

18. The method of claim 16, wherein the first tree key includes a bit value to indicate whether the mapping is address mapping information or bit map information.

* * * * *